(12) United States Patent
Amine et al.

(10) Patent No.: US 7,507,503 B2
(45) Date of Patent: Mar. 24, 2009

(54) LONG LIFE LITHIUM BATTERIES WITH STABILIZED ELECTRODES

(75) Inventors: Khalil Amine, Downers Grove, IL (US); Jun Liu, Naperville, IL (US); Donald R. Vissers, Naperville, IL (US); Wenquan Lu, Darien, IL (US)

(73) Assignee: U Chicago Argonne LLC, Chicago, IL (US)

( * ) Notice: Subject to any disclaimer, the term of this patent is extended or adjusted under 35 U.S.C. 154(b) by 446 days.

(21) Appl. No.: 11/297,120

(22) Filed: Dec. 8, 2005

(65) Prior Publication Data

US 2006/0134527 A1 Jun. 22, 2006

Related U.S. Application Data

(60) Provisional application No. 60/636,636, filed on Dec. 16, 2004.

(51) Int. Cl.
*H01M 6/16* (2006.01)
(52) U.S. Cl. .............................. 429/329; 252/62.2
(58) Field of Classification Search ................ None
See application file for complete search history.

(56) References Cited

U.S. PATENT DOCUMENTS

| | | | |
|---|---|---|---|
| 4,513,143 A | 4/1985 | Ng et al. | |
| 5,849,432 A | 12/1998 | Angell et al. | |
| 6,045,952 A | 4/2000 | Kerr et al. | |
| 6,232,021 B1 | 5/2001 | Negoro | |
| 6,306,546 B1 | 10/2001 | LaFleur et al. | |
| 6,387,571 B1 | 5/2002 | Lain et al. | |
| 6,562,513 B1 * | 5/2003 | Takeuchi et al. | 429/189 |
| 6,780,545 B2 | 8/2004 | Birke-Salam et al. | |
| 2002/0039687 A1 | 4/2002 | Barker et al. | |
| 2004/0029017 A1 | 2/2004 | Besenhard et al. | |
| 2004/0131934 A1 | 7/2004 | Sugnaux et al. | |
| 2004/0157126 A1 | 8/2004 | Belharouak et al. | |
| 2005/0019670 A1 | 1/2005 | Amine et al. | |
| 2006/0199080 A1 * | 9/2006 | Amine et al. | 429/326 |

FOREIGN PATENT DOCUMENTS

JP 75000095 1/1975

OTHER PUBLICATIONS

International Search Report for PCT Application No. PCT/US06/08664, dated Dec. 13, 2006.
Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

(Continued)

*Primary Examiner*—Patrick Ryan
*Assistant Examiner*—Alix Echelmeyer
(74) *Attorney, Agent, or Firm*—Foley & Lardner LLP

(57) ABSTRACT

The present invention relates to non-aqueous electrolytes having electrode stabilizing additives, stabilized electrodes, and electrochemical devices containing the same. Thus the present invention provides electrolytes containing an alkali metal salt, a polar aprotic solvent, and an electrode stabilizing additive. In some embodiments the additives include a substituted or unsubstituted cyclic or spirocyclic hydrocarbon containing at least one oxygen atom and at least one alkenyl or alkynyl group. When used in electrochemical devices with, e.g., lithium manganese oxide spinel electrodes or olivine or carbon-coated olivine electrodes, the new electrolytes provide batteries with improved calendar and cycle life.

27 Claims, 12 Drawing Sheets

OTHER PUBLICATIONS

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leqq y \leqq 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

\* cited by examiner

LONG LIFE LITHIUM BATTERIES WITH STABILIZED ELECTRODES

CROSS-REFERENCES TO RELATED APPLICATIONS

This application claims the benefit of U.S. Provisional Application No. 60/636,636 filed Dec. 16, 2004, the entire contents of which is incorporated herein by reference.

GOVERNMENT INTERESTS

This invention was made with Government support under Contract No. W-31-109-ENG-38 awarded by the Department of Energy. The Government has certain rights in this invention.

FIELD OF THE INVENTION

This invention relates to non-aqueous electrolytes comprising electrode stabilizing additives, stabilized electrodes and electrochemical devices containing the same. In particular, the invention relates to long life lithium batteries with stabilized spinel, olivine or other electrodes.

BACKGROUND

Lithium-ion batteries utilize carbon anodes, lithiated transition metal oxide cathodes, and an organic-based solvent electrolyte with a dissolved conducting salt such as lithium hexafluorophosphate ($LiPF_6$). These batteries currently dominate the battery market in the area of cellular phones, cam-recorders, computers, and other electronic equipment. However, attempts to apply these battery technologies to electric and hybrid vehicles have met with limited success. Problematic areas include safety, calendar life, cost, and, in the case of hybrid vehicles, high rate capability for power assist and regenerative braking.

Lithium-manganese-oxide-spinel-based electrodes have drawn enormous attention as a cathode material, since manganese (Mn) is less expensive than cobalt (Co) and nickel (Ni), which are currently used in commercial Li-ion cells. Mn also has better power characteristics, is safer, and is environmentally benign when compared to Co and Ni. However, poor capacity retention (fading) of $LiMn_2O_4$ spinel has been a major drawback of this technology and has prevented its wide acceptance by in the industry. Moreover, the deterioration of its electrochemical performance, including capacity loss, impedance rise, and material instability is far more severe at higher temperatures (i.e. above 40-50° C.) that can easily be reached in portable electronic devices or hybrid electric vehicles. Although several factors have been reported to be responsible for the electrochemical degradation of the spinel based cells, it is generally attributed to the instability of manganese spinel. This degradation likely results from the formation and dissolution of manganese ions in the organic based electrolyte.

The dissolution of the manganese originates from the instability of the manganese (III) ions on the surface of the manganese spinel electrode during cycling in the $LiPF_6$-based organic electrolyte that is used in nearly all commercial Li-ion batteries today. The manganese (III) instability results from a disproportionation reaction that occurs on the surface of the spinel electrode ($2Mn^{3+}_{(stable\ solid)} \rightarrow Mn^{4+}_{(stable\ solid)} + Mn^{2+}_{(unstable\ solid,\ tending\ to\ be\ dissolved)}$). The $Mn^{2+}$ ions that are formed, dissolve in the $LiPF_6$-containing organic electrolyte. Thereafter, the dissolved manganese ions diffuse through the electrolyte to the graphite anode where they are likely reduced to manganese metal and deposited on the anode surface. This phenomenon results in a huge increase in the impedance of the anode and a loss of active lithium from the cell, as well as the degradation of the spinel cathode. The result is a cell with poor electrochemical performance and little or no power.

In addition, manganese dissolution has been attributed to acid attack, and occurs even with trace levels of HF, commonly present in $LiPF_6$-based electrolytes. Together with the manganese ion diffusion problem as mentioned above, the presence of acid such as HF causes formation of a partially protonated $\lambda$-$MnO_2$ phase. This phase is not totally electrochemically active, since the protons are bonded to octahedral oxygen sites of the cubic close-packed oxygen array of $MnO_6$. This scenario suggests that with the manganese dissolution there is also the partial protonation of the $\lambda$-$MnO_2$ that leads to the deterioration of manganese spinel cathode material.

As another alternative to Ni— and Co-based lithium ion cells, olivine based cathodes have garnered much attention. In particular, since its introduction by Padhi et al. [A. K. Padhi, K. S. Nanjundaswamy, J. B. Goodenough, J. Electrochem. Soc., 144 (4), 1188 (1997)], $LiFePO_4$ olivine material has become one of the most studied cathodes for lithium-ion battery (LIB) applications. Unlike many cathodes, the electrochemistry of this material involves the $Fe^{2+}/Fe^{3+}$ redox couple, which occurs at a voltage of 3.45V, and has a theoretical capacity of 170 mAh/g. Discharged and charged positive active materials, $LiFePO_4$ and $FePO_4$, respectively, have the same structural arrangement, i.e. the same space group and close crystalline parameters, leading to very good system stability during the electrochemical cycling process. This stability is not altered by $Fe^{3+}$ ion generation, in contrast to the highly oxidizing $Ni^{4+}$ ions that are involved in the charging of $LiM^{III}O_2$ (M=Ni, Co) layered materials. In addition, the cutoff voltage of 3.45 V is low enough to prevent the acceleration of electrolyte aging but not so low as to sacrifice the energy density or electrochemical performance of the olivine. Moreover, $LiFePO_4$ is an inexpensive material, non-toxic and environmentally benign. For these reasons, $LiFePO_4$ has been considered as a potentially attractive cathode material for LIB.

However, $LiFePO_4$ is an insulating material, which seriously limits its rate capability and thus its calendar life. Although extensive work has been conducted recently to enhance the electronic conductivity of the material, much room for improvement exists.

To prevent degradation of the cathode material, several approaches have been attempted, including cationic substitution of manganese or surface modification (coatings) of the spinel cathode or of graphite anode surfaces. See, e.g., C. Sigala, A. et al., *J Electrochem. Soc.*, 148, A826 (2001).; I. J. Davidson, et al., *J. Power Sources*, 54, 205 (1995); M. Yoshio, et al., *J. Power Sources*, 101, 79 (2001); and A. M. Kannan and A. Manthiram, *Electrochem. Solid State Lett.*, 5, A167 (2002). While these methods have shown some promise at room temperature, none have prevented significant electrochemical deterioration due to the manganese dissolution at elevated temperatures. See, e.g., A. Blyr, et al., *J. Electrochem. Soc.*, 145, 194 (1998); and G. G. Amatucci, et al., *J. Electrochem. Soc.*, 148, A171 (2001). Accordingly, there is a need in the art to develop electrolyte systems that protect the cathode surface from any unwanted reactions. Furthermore, there is a need in the art for batteries using such electrolyte systems.

SUMMARY

In one aspect, the invention provides non-aqueous electrolyte solutions containing one or more electrode stabilizing additives for use in electrochemical devices. The electrode stabilizing additives include substituted and unsubstituted cyclic and spirocyclic hydrocarbons containing at least one oxygen atom and at least one alkenyl or alkynyl group. In another aspect, there are provided stabilized electrodes and battery cells using the stabilization additives. Such batteries have excellent specific power and energy as well as extended calendar and cycle life across a broad temperature range with little or no power or capacity loss. In yet another aspect, there are provided methods of making the non-aqueous electrolytes containing stabilization additives of the invention. Such electrolytes are effective in enhancing the performance of both spinel-based and olivine-based lithium ion batteries, as well as that of lithium cobalt oxide, lithium nickel-cobalt-oxide, and lithium vanadium oxide lithium ion cells and the like.

BRIEF DESCRIPTION OF DRAWINGS

FIG. 5A is after 1 cycle at 25° C.; and FIG. 5B is after 25 cycles at 55° C. Electrolyte used is 1.2 M $LiPF_6$ EC:PC:DMC (1:1:3).

DETAILED DESCRIPTION

Figure 1:
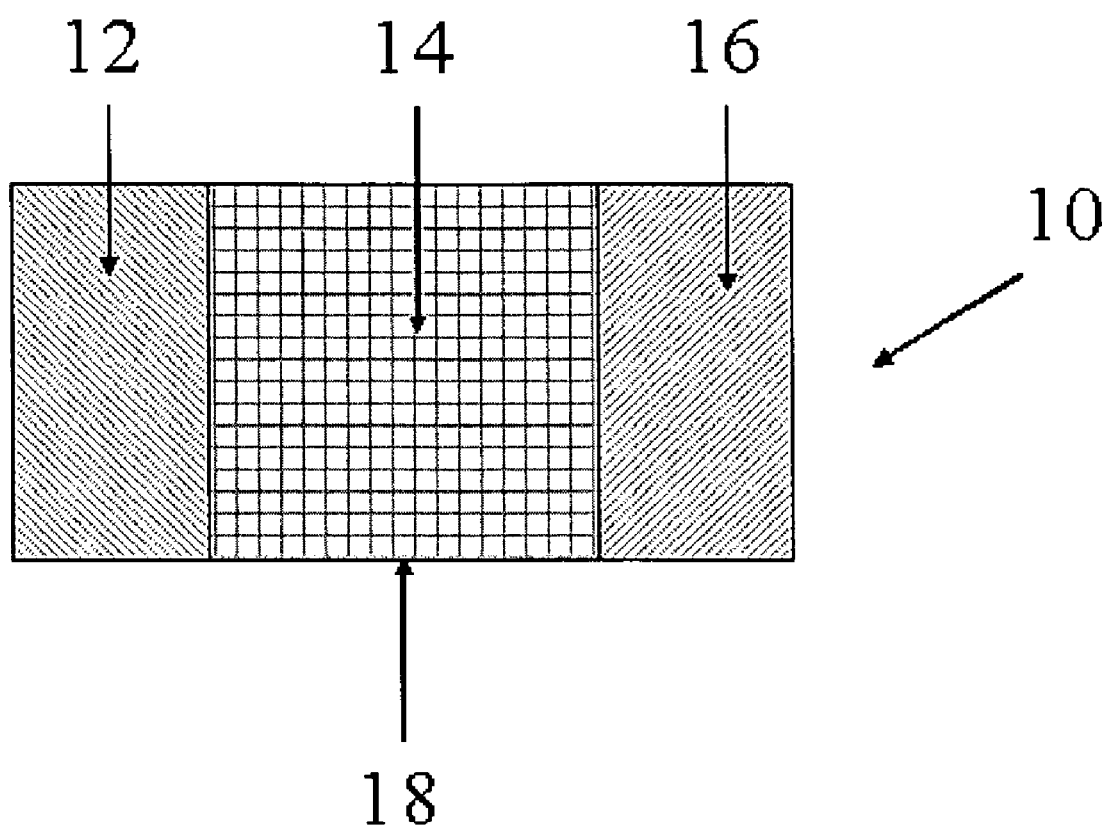
FIG. 1 depicts a schematic representation of an electrochemical cell as described in Example 1.

In accordance with one aspect of the present invention there are provided electrolytes that include an alkali metal salt; a polar aprotic solvent; and an electrode stabilizing additive that is a substituted or unsubstituted spirocyclic hydrocarbon containing at least one oxygen atom and at least one alkenyl or alkynyl group. The electrolytes are substantially non-aqueous, i.e., the electrolytes contain either no water or almost no water (e.g., ≦100 ppm water). The electrode stabilizing additive can contain 1, 2, 3, 4, 5, or 6 or more oxygen atoms. In some embodiments, the electrode stabilizing additive has 1 or more alkenyl groups, and in others, 1 or 2 alkenyl groups.

Spirocyclic additives having Formula I are particularly suitable for use in inventive electrolytes:

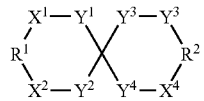

wherein $X^1$, $X^2$, $X^3$, and $X^4$ are independently O or $CR^3R^4$; provided that $X^1$ is not O when $Y^1$ is O, $X^2$ is not O when $Y^2$ is O, $X^3$ is not O when $Y^3$ is O, and $X^4$ is not O when $Y^4$ is O;

$Y^1$, $Y^2$, $Y^3$, and $Y^4$ are independently O or $CR^3R^4$; provided that $Y^1$ is not O when $X^1$ is O, $Y^2$ is not O when $X^2$ is O, $Y^3$ is not O when $X^3$ is O, and $Y^4$ is not O when $X^4$ is O;

$R^1$ and $R^2$ are independently a substituted or unsubstituted divalent alkenyl or alkynyl group; and $R^3$ and $R^4$ at each occurrence are independently H, F, Cl, a substituted or an unsubstituted alkyl, alkenyl, or alkynyl group.

In some such embodiments of additives of Formula I, at least one of $X^1$, $X^2$, $X^3$, and $X^4$ is O. In others, $X^1$ is O, or each of $X^1$, $X^2$, $X^3$, and $X^4$ is O. In other embodiments of Formula I, $R^1$ and $R^2$ are the same. For example, $R^1$ and $R^2$ can each be CH—CH=$CH_2$, C=$CH_2$, or C=$CHCH_3$. In other embodiments, $R^3$ and $R^4$ are both H. Suitable stabilizing additives of Formula I include 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. Those compounds which are not commercially available are readily prepared by techniques well known in the art such as those found in U.S. Pat. Nos. 4,513,143 and 4,532,335 among others.

In another aspect of the invention there are provided electrolytes including an alkali metal salt; a polar aprotic solvent; and an electrode stabilizing additive having Formula II:

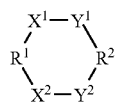

wherein, $X^1$ and $X^2$ are independently O, $CHR^3$, $CHR^4$, or $CR^3R^4$; provided that $X^1$ is not O when $Y^1$ is O, and $X^2$ is not O when $Y^2$ is O;

$Y^1$ and $Y^2$ are independently O, $CHR^3$, $CHR^4$, or $CR^3R^4$; provided that $Y^1$ is not O when $X^1$ is O and $Y^2$ is not O when $X^2$ is O;

$R^1$ and $R^2$ are independently a substituted or unsubstituted divalent alkenyl or alkynyl group;

$R^3$ and $R^4$ at each occurrence are independently H, F, Cl, a substituted or an unsubstituted alkyl, alkenyl, or alkynyl group; and wherein the electrolyte is substantially non-aqueous.

Representative compounds of Formula II include, but are not limited to, 2,4-divinyl-tetrahydropyran, 2,5-divinyl-tetrahydropyran, 2,6-divinyl-tetrahydropyran, 2,5-divinyl-[1,4]dioxane, 2,5-divinyl-[1,3]dioxane, and 2-ethylidene-5-vinyl-[1,3]dioxane and mixtures of any two or more thereof.

Stabilizing additives of the invention are present in a wide range of amounts in the non-aqueous electrolyte. For example, the stabilizing additive can be present at from about 0.0005 to about 15 or 30 weight percent (wt %) of the electrolyte. Alternatively, the additive can be present from about 0.0005, 0.001, 0.01, or 0.1 wt % to about 2, 5, or 10 wt %. Based on the disclosure herein, it is well within the skill of the ordinary artisan to select the appropriate amount of stabilizing additives for use in electrolytes of the invention.

Inventive electrolytes include an alkali metal salt dissolved in a polar aprotic solvent. The alkali metal salt is typically present at a concentration of from about 0.5 to about 2 molar and is typically a lithium salt. Exemplary lithium salts include $Li[(C_2O_4)_2B]$, $Li(C_2O_4)BF_2$, $LiPF_2C_4O_8$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof. Lithium(chelato)borates such as $Li[(C_2O_4)_2B]$ and $Li(C_2O_4)BF_2$ or lithium (chelato)phosphates such as $LiPF_2C_4O_8$ can also be used as the alkali metal salt, or as an additional stabilizing additive. Thus, in some embodiments, the alkali metal salt is other than a lithium (chelato)borate or a lithium(chelato)phosphate and the electrolyte further includes about 0.0005 to about 15 wt % $Li[(C_2O_4)_2B]$, $Li(C_2O_4)BF_2$, or $LiPF_2C_4O_8$.

Suitable polar aprotic solvents for use in non-aqueous electrolytes are known in the art and include, for example, ethyl acetate, propyl acetate, ethylene carbonate, propylene carbonate, dimethyl carbonate, diethyl carbonate, ethyl methyl carbonate, dimethyl ether, diethyl ether, methyl acetate, gamma-butyrolactone, sulfolane, or a mixture of any two or more thereof. Protic solvents such as water and alcohols cannot be used with the present invention.

There are further provided methods of making the non-aqueous electrolytes of the present invention. For example, in some embodiments, the method includes combining an alkali metal salt; a polar aprotic solvent; and an electrode stabilizing additive as described herein, including but not limited to a substituted or unsubstituted cyclic or spirocyclic hydrocarbon containing at least one oxygen atom and at least one alkenyl or alkynyl group. In some such embodiments, the electrode stabilizing additive is cyclic and includes compounds of Formula I. In another embodiment, the electrode stabilizing additive includes compounds of Formula II. The present methods can employ any of the alkali metal salts or polar aprotic solvents described herein.

While not wishing to be limited by any theory, it is believed that electrochemical devices of the present invention exhibit enhanced performance due to the electrode stabilizing additives present in the non-aqueous electrolytes. Thus, it is believed that the additives protect the electrodes from chemical attack, thereby lessening or preventing subsequent performance degradation. Specifically, it is believed that during initial formation of the electrochemical device, the additive forms a protective film on the surface of the positive electrode (cathode), and can also form a protective film on the surface of the negative electrode (anode). The passivating film prevents $Mn^{2+}$ and $Fe^{2+}$ ions from dissolving in the electrolyte and stabilizes the cell in general. Where a passivating film is formed on the anode, the film also lessens or prevents the reduction of $Mn^{2+}$ ions (from spinel cathodes) and $Fe^{2+}$ ions (from olivine cathodes) at the anode surface. During the film-forming process, inventive additives may be oxidized, or oxidized and polymerized. Additives of the invention typically have an oxidation potential ranging from about 1.5V to about 6.5V.

Thus, in accordance with another aspect, the invention provides an electrode for an electrochemical device comprising a surface and a passivating film formed on the surface from an electrode stabilizing additive. The passivating film may be formed from any additive described herein, including a substituted or unsubstituted spirocyclic hydrocarbon containing at least one oxygen atom and at least one alkenyl or alkynyl group. Thus, for example, spirocyclic additives, including those of Formula I may be used to passivate inventive electrodes. The passivating film may also be formed from cyclic additives having Formula II. Alternatively, a combination of two cyclic and/or spirocyclic additives can be used. In some such embodiments, one additive is selective for forming a passivating film on the cathode to prevent leaching of metal ions and the other additive can be selective for passivating the anode surface to prevent or lessen the reduction of metal ions at the anode. For example, a combination of 2,4-divinyl-tetrahydropyran and 2,5-divinyl-[1,3]dioxane, or 2,5-divinyl-tetrahydropyran and 2-ethylidene-5-vinyl-[1,3]dioxane can be used as the electrode stabilizing additive.

In another aspect, the invention provides a method for forming a passivating film on a cathode comprising charging an electrochemical device, wherein the electrochemical device comprises: an anode; a cathode; and a substantially non-aqueous electrolyte comprising an alkali metal salt; a polar aprotic solvent; and an electrode stabilizing additive that is a substituted or unsubstituted spirocyclic hydrocarbon containing at least one oxygen atom and at least one alkenyl or alkynyl group. The charging step may be followed by a discharging step. In some embodiments, the charging and discharging steps may be repeated two or more times.

In another aspect of the invention, any of the electrolytes described herein may further comprise a second electrode stabilizing additive. Thus, in one embodiment, the electrolyte includes an alkali metal salt; a polar aprotic solvent; a first electrode stabilizing additive that is a substituted or unsubstituted spirocyclic hydrocarbon containing at least one oxygen atom and at least one alkenyl or alkynyl group; and a second electrode stabilizing additive that is capable of stabilizing the anode. Suitable second electrode stabilizing additives include, but are not limited to, vinyl ethylene carbonate, vinyl carbonate; a lithium (chelato)borate such as $Li(C_2O_4)_2B$ or $Li(C_2O_4)BF_2$; a lithium(chelato)phosphate such as $LiPF_2C_4O_8$; a cyclotriphosphazene such as P-ethoxy-P,P',P"-pentafluorocyclotriphosphazene (Formula III), P,P'-diethoxy-P,P',P"-tetrafluorocyclotriphosphazene (Formula IV), P-phenoxy-P, P',P"-pentafluorocyclotriphosphazene (Formula V), P,P',P"-hexamethoxycyclotriphosphazene (Formula VI), or P-phenoxy-P'-(prop-2-ene-oxy)-P,P',P"-pentafluorocyclotriphosphazene (Formula VII); or a mixture of any two or more thereof. In some embodiments, especially those in which the second electrode stabilizing additive is a lithium(chelato)borate or a lithium (chelato)phosphate, the alkali metal salt is other than $Li(C_2O_4)_2B$, $Li(C_2O_4)BF_2$, or $LiPF_2C_4O_8$. The second electrode stabilizing additive may be present from about 0.01 wt % to about 15 wt %. Exemplary structures of representative cyclotriphosphazenes are provided below.

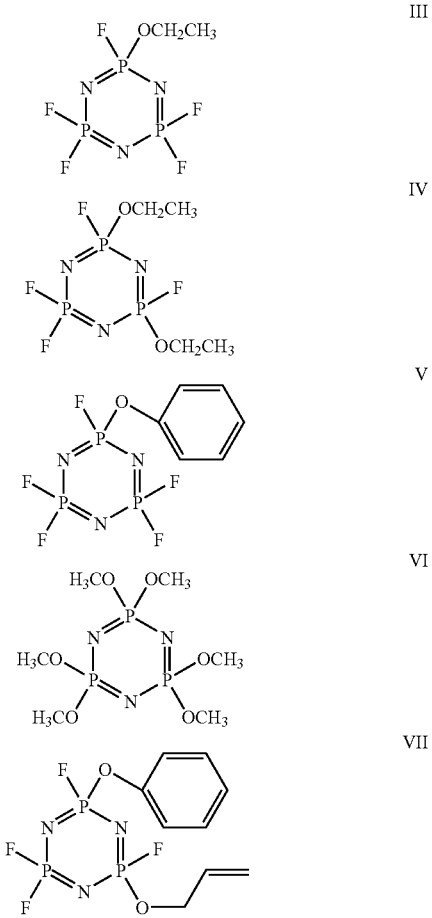

In another aspect, the invention provides a method for forming a passivating film on an anode comprising charging an electrochemical device, wherein the electrochemical device comprises: an anode; a cathode; and a substantially non-aqueous electrolyte comprising an alkali metal salt; a polar aprotic solvent; and an electrode stabilizing additive that is selected from vinyl ethylene carbonate, vinyl carbonate; a lithium(chelato)borate such as $Li(C_2O_4)_2B$, $Li(C_2O_4)BF_2$, or mixtures thereof; a lithium(chelato)phosphate such as $LiPF_2C_4O_8$; a cyclotriphosphazene; or a mixture of any two or more thereof. In another aspect, the charging step may be followed by a discharging step. In yet another aspect, the charging and discharging steps may be repeated two or more times.

In another aspect, a method is provided for forming a passivating film on both an anode and a cathode comprising charging an electrochemical device, wherein the electrochemical device comprises: an anode; a cathode; and a substantially non-aqueous electrolyte comprising an alkali metal salt; a polar aprotic solvent; a first electrode stabilizing additive that is a substituted or unsubstituted spirocyclic hydrocarbon containing at least one oxygen atom and at least one alkenyl or alkynyl group; and a second electrode stabilizing additive that is capable of stabilizing the anode such as vinyl ethylene carbonate, vinyl carbonate, a lithium(chelato)borate, a lithium(chelato)phosphate, a cyclotriphosphazene, or a mixture of any two or more thereof. The charging step may be followed by a discharging step. In some embodiments, the charging and discharging steps may be repeated two or more times.

In another aspect, the invention provides an electrochemical device comprising: a cathode; an anode; and an electrolyte as described herein. In one embodiment, the electrochemical device is a lithium secondary battery; the cathode is a lithium metal oxide cathode; the anode is a carbon or lithium metal anode; and the anode and cathode are separated from each other by a porous separator. Typically, the cathode in such a cell includes spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $Li_{1+x}Ni_\alpha Mn_\beta Co_\gamma Met'_{\delta} O_{2-z}F_{z'}$, $A_n B_2(XO_4)_3$ (Nasicon), vanadium oxide, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, and Zn; B is Ti, V, Cr, Fe, and Zr; X is P, S, Si, W, Mo; $0 \leq x \leq 0.3$, $0 \leq y \leq 0.5$, $0 \leq z \leq 0.5$, $0 \leq m \leq 0.5$ and $0 \leq n \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$. In such devices the anode may comprise graphite, amorphous carbon, $Li_4Ti_5O_{12}$, tin alloys, silicon alloys, intermetallic compounds, lithium metal, or mixtures of any two or more thereof. Suitable graphitic materials including natural graphite, artificial graphite, graphitized meso-carbon microbeads, partially graphitized carbon, and graphite fibers, as well as any amorphous carbon materials.

In the electrochemical cells of the present invention, the cathode can include spinel, olivine, or carbon-coated olivine (see Published U.S. patent application Ser. No. 2004/0157126). For example, the spinel can be a spinel manganese oxide with the formula of $Li_{1+x}Mn_{2-z}Met_yO_{4-m}X_n$, wherein Met is Al, Mg, Ti, B, Ga, Si, Ni, or Co; X is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. Alternatively, the cathode can comprise olivine with a formula of $LiFe_{1-z}Met''_yPO_{4-m}X_n$, wherein Met'' is Al, Mg, Ti, B, Ga, Si, Ni, Mn or Co; X is S or F; and wherein $0 \leq x \leq 0.3$; $0 \leq y \leq 0.5$, $0 \leq z \leq 0.5$, $0 \leq m \leq 0.5$ and $0 \leq n \leq 0.5$.

Cathodes of the present invention may be further stabilized by surface coating the particles of the cathode (e.g., spinel or olivine) with a material that can neutralize acid or otherwise lessen or prevent leaching of the manganese or iron ions. Hence the cathodes can also comprise a surface coating of a metal oxide on the spinel or olivine particles such as $ZrO_2$, $TiO_2$, $ZnO_2$, $WO_3$, $Al_2O_3$, $MgO$, $SiO_2$, $SnO_2$ $AlPO_4$, $Al(OH)_3$, a mixture of any two or more thereof, or any other suitable metal oxide. The coating can also be applied to a carbon-coated olivine. Where carbon-coated olivine is used, the metal oxide coating can be applied to the carbon-coated olivine or can be applied to the olivine first followed by carbon coating of the metal oxide film. Methods for coating spinel cathodes with metal oxides are disclosed below and may be adapted for use with olivine cathodes.

The metal oxide coating on spinel can be applied using a variety of processes. For example, the coating element source can be dissolved in an organic solvent or water. The coating element sources include metal alkoxide, salt or oxide (e.g., aluminum isopropoxide or magnesium methoxide). Spinel cathode materials are then dispersed in the coating solution. The mixture is stirred until the organic solvent is completely evaporated. If necessary, a flushing gas ($CO_2$ or moisture-free inert gas) may be used to help facilitate evaporation of the solvent in the coating solution. The dried, coated material is then heat-treated at a temperature ranging from about 100° C. to about 500° C.

A $TiO_2$ coating can be applied to spinel powders by hydroxylation of tetra-n-butyl titanate (TBT). Thus, for example, the titanate can be reacted with LiOH to precipitate the titanium hydroxide onto the spinel powder. The coated material can be heat-treated at about 100° C. to about 400° C. to yield spinel particles with the desired oxide coating.

A sol-gel process may also be employed in the coating of the spinel. The coating materials including M-ethylhexanate-diisopropoxide (M=Zr, Al, Ti, B, Si) and tin ethylhexanoisopropoxide can be dissolved in alcohol (e.g., 2-propanol or isopropanol). The cathode materials are then mixed with the coating solution and annealed at from about 100° C. to about 500° C. Alternatively, a coating solution can be prepared by dissolving ethyl silicate in ethanol and water. Spinel powder is immersed in the coating solution, stirred, dried at 110° C., and then is calcined at from about 200° C. to about 500° C.

The process of coating spinel with $AlPO_4$ can be carried out by dissolving aluminum nitrate and ammonium phosphate in water until a light white suspension solution (the $AlPO_4$ nanoparticle solution) is observed. Spinel cathode powder is then added to the coating solution and mixed. The slurry can be dried and annealed at from about 100° C. to about 500° C.

Colloidal suspensions may also be used to coat spinel with metal oxides. For example, the spinel powders can be coated using a 4 wt % (~0.3 mol %) colloidal $ZrO_2$ suspension. The spinel particles are immersed and stirred in the $ZrO_2$ suspension for about 1 h, followed by evaporation of the nascent liquid at 75° C. Thereafter, the products can be heated at about 200° C. to about 400° C. or about 500° C.

Alternatively, the $ZrO_2$ coating of spinel can be carried out by using two different coating solutions (zirconium oxide+polymeric precursor or an aqueous solution of zirconium nitrate). Spinel may be mixed with the coating solutions until the mixture is dry. Then the mixture may be heated at about 100° C. to evaporate the solvents in the coating solutions. The dried mixture may then be heat-treated at 200-500° C.

A $ZnO_2$ coating may be applied to the spinel by dissolving zinc acetate in water, followed by adding the spinel powder, and thoroughly mixing for about 4 h at room temperature. After drying, the coated powder is heated at 120° C., and is further calcined at about 200° C. to about 400° C.

Finally, spinel may be coated using a co-precipitation process. Spinel powder is dispersed into a $NaHCO_3$ solution and ultrasonically agitated. The suspension is then stirred mechanically while $Al_2(SO_4)_3$ solution is added dropwise to it. In this way, $Al(OH)_3$ is precipitated onto the spinel particle surface. The final powder is filtered, washed, and dried. The dried powder is heated in air at about 200° C. to about 600° C.

In some embodiments of electrochemical devices of the invention, the cathode is spinel, olivine, or carbon-coated olivine and the alkali metal salt of the electrolyte includes $Li(C_2O_4)BF_2$, $Li[(C_2O_4)_2B]$, $LiPF_2C_4O_8$, or mixtures of any two or more thereof. In some such embodiments, the electrode stabilizing additive is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. In any of these embodiments, the cathode can include a surface coating of a metal oxide as described herein.

Stabilized electrodes comprised of blends of materials and electrochemical devices employing the same are also within the scope of the present invention. For example, the cathode can include a blend of spinel and $Li_{1+x'}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. The ratio of spinel to $Li_{1+x'}Ni_\alpha Mn_\beta Co_\gamma Met'_\delta O_{2-z'}F_{z'}$ is typically from about 0.5 to about 98 wt % and, in some embodiments, about 0.5 to about 60 wt %. Suitable cathodes can also include a blend of olivine or carbon-coated olivine and $Li_{1+x'}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. As before, the ratio of olivine or carbon-coated olivine to $Li_{1+x'}Ni_\alpha Mn_\beta Co_\gamma Met'_\delta O_{2-z'}F_{z'}$ can be from about 0.5 to about 98 wt %".

Such mixed electrodes can be used with any of the electrochemical devices described herein, including those in which the alkali metal salt of the electrolyte is $Li(C_2O_4)BF_2$, $Li[(C_2O_4)_2B]$, $LiPF_2C_4O_8$, or mixtures of any two or more thereof as well as those utilizing the electrode stabilizing additives described herein.

The porous separator may be made from materials well known to those skilled in the art. Typically, the porous separator comprises polypropylene, polyethylene, or a multilayer laminate of polypropylene and polyethylene.

Thus, in accordance with one embodiment, the electrochemical device of the invention includes a spinel, olivine, or carbon-coated olivine cathode; a graphite or amorphous carbon anode; and a substantially non-aqueous electrolyte comprising an alkali metal salt that is $Li(C_2O_4)BF_2$, $Li[(C_2O_4)_2B]$, $LiPF_2C_4O_8$, or mixtures thereof; a polar aprotic solvent that is ethyl acetate, propyl acetate, ethylene carbonate, propylene carbonate, dimethyl carbonate, diethyl carbonate, ethyl methyl carbonate, dimethyl ether, gamma-butyrolactone, or a mixture of any two or more thereof; and an electrode stabilizing additive that is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or mixtures of any two or more thereof.

The following terms are used throughout as defined below.

Spirocyclic hydrocarbons include ring systems comprising carbon and hydrogen and having two or more rings in which at least two of the rings are joined at a single carbon. Typically, spirocyclic hydrocarbons of the invention include from 8 to 20 carbons, and, in some embodiments, from 8 to 16 carbons.

The term "spinel" refers to manganese-based spinel such as, e.g., $Li_{1+x}Mn_{2-z}Met_y O_{4-m}X_n$, wherein Met is Al, Mg, Ti, B, Ga, Si, Ni, or Co; X is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

The term "olivine" refers to iron-based olivine such as, e.g., $LiFe_{1-z}Met''_y PO_{4-m}X_n$, wherein Met'' is Al, Mg, Ti, B, Ga, Si, Ni, Mn or Co; X is S or F; and wherein $0 \leq x \leq 0.3$; $0 \leq y \leq 0.5$, $0 \leq z \leq 0.5$, $0 \leq m \leq 0.5$ and $0 \leq n \leq 0.5$.

Alkyl groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH-CH=CH_2$, $C=CH_2$, or $C=CHCH_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to $CH-C \equiv CH$.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Example 1

Figure 2:
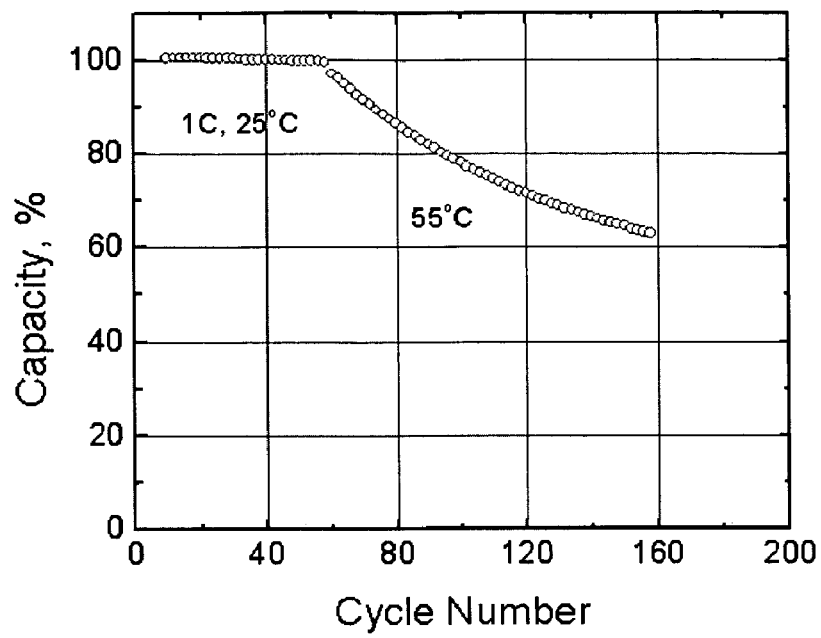
FIG. 2 is a schematic illustration of the specific capacity retention of $LiMn_2O_4$ spinel cathode versus carbon anode in 1.2 M $LiPF_6$ in 3:7 mixture of ethylene carbonate (EC)/ethyl methyl carbonate (EMC) electrolyte at 55° C.

The specific examples referred to here utilizes an electrochemical cell, such as that depicted in FIG. 1. Referring to FIG. 1, the electrochemical cell 10 includes an anode 12 separated by an electrolyte/separator 14 and a cathode 16, all contained in an insulating housing 18. The anode is separated from the cathode by the electrolyte, and suitable terminals (not shown) are provided to be in electrical contact, respectively, with the anode 12 and the cathode 16. Binders (e.g., polyvinylidene difluoride) associated with the respective electrodes are well known in the art and will not be described here. In this particular example, the electrochemical cell comprises a graphite anode such as natural graphite, artificial graphite, meso-carbon microbead, carbon fiber or hard carbon, a manganese spinel cathode, and an electrolyte of approximately 1.2 M $LiPF_6$ in EC:EMC (3:7 by weight). FIG. 2 depicts the resulting capacity retention when the cell was cycled between 3.0 and 4.1 V. It shows a drastic capacity decrease with cycling at 55° C.

Example 2

Figure 3:
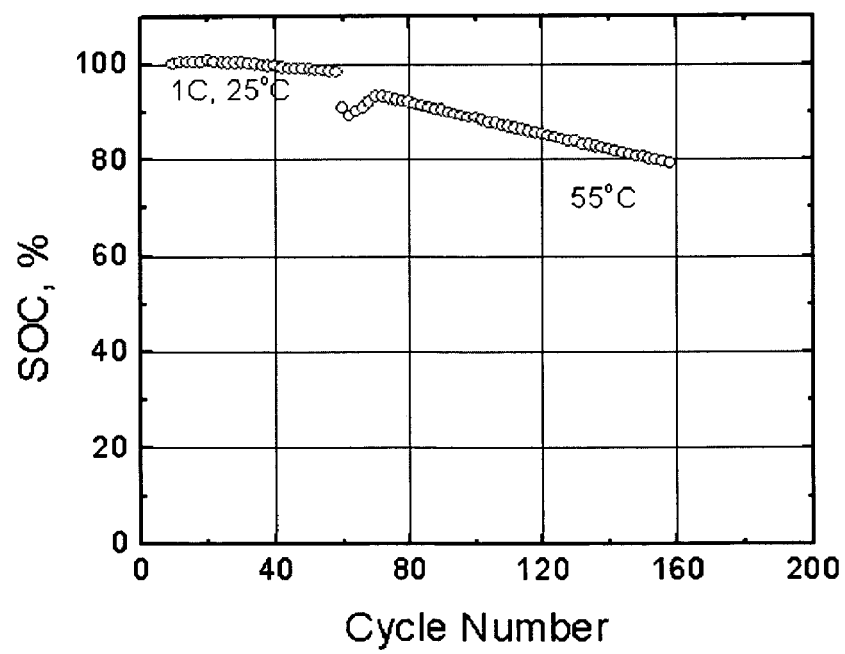
FIG. 3 is a schematic illustration of the specific capacity retention of $LiMn_2O_4$ cathode versus a carbon anode in 1.2 M $LiPF_6$ in EC/EMC (3:7) electrolyte with 1 weight percent (wt %) 3,9-divinyl-2,4,8,10-tetraoxaspiro[5.5]undecane (TOS-1) as an additive, at 55° C.
Figure 4:
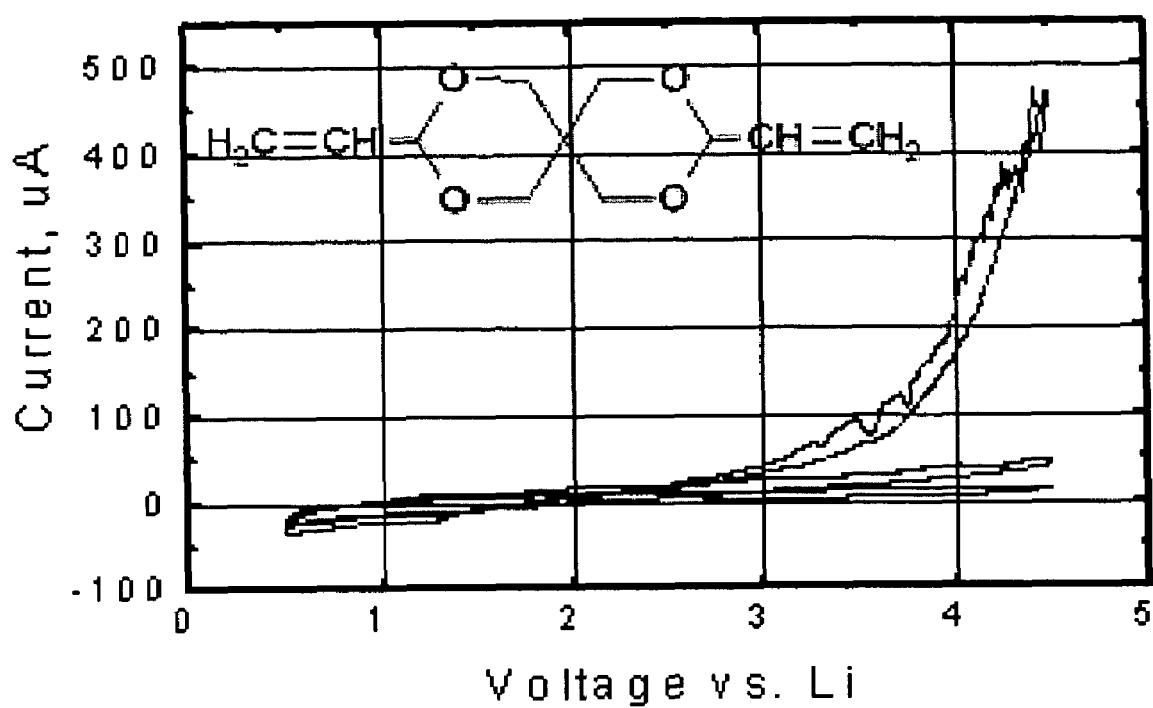
FIG. 4 shows the cyclic voltammogram of 3,9-divinyl-2,4,8,10-tetraoxaspiro[5.5]undecane additive. The electrolyte used is 1.2 M $LiPF_6$ in EC/EMC (3:7).

One wt % 3,9-divinyl-2,4,8,10-tetraoxaspiro[5.5]undecane (TOS-1; available from SIGMA-ALDRICH, Milwaukee) was added to the electrolyte of the electrochemical cell of Example 1. The cell was than cycled at 100% DOD at 55° C. for over 150 cycles. The results of cycling the cell between 3.0 and 4.1 V is shown in FIG. 3. This cell demonstrated improved capacity retention over the electrochemical cell of Example 1 (compare FIGS. 2 and 3). It is believed that the improvement results from formation of a thin film on the electrodes by the additive. FIG. 4 shows the results of cyclic voltammetry with TOS-1 over the voltage range encountered in the electrochemical cell. The increase in current is consistent with the oxidation and/or polymerization of the additive.

Example 3.

Figure 5:
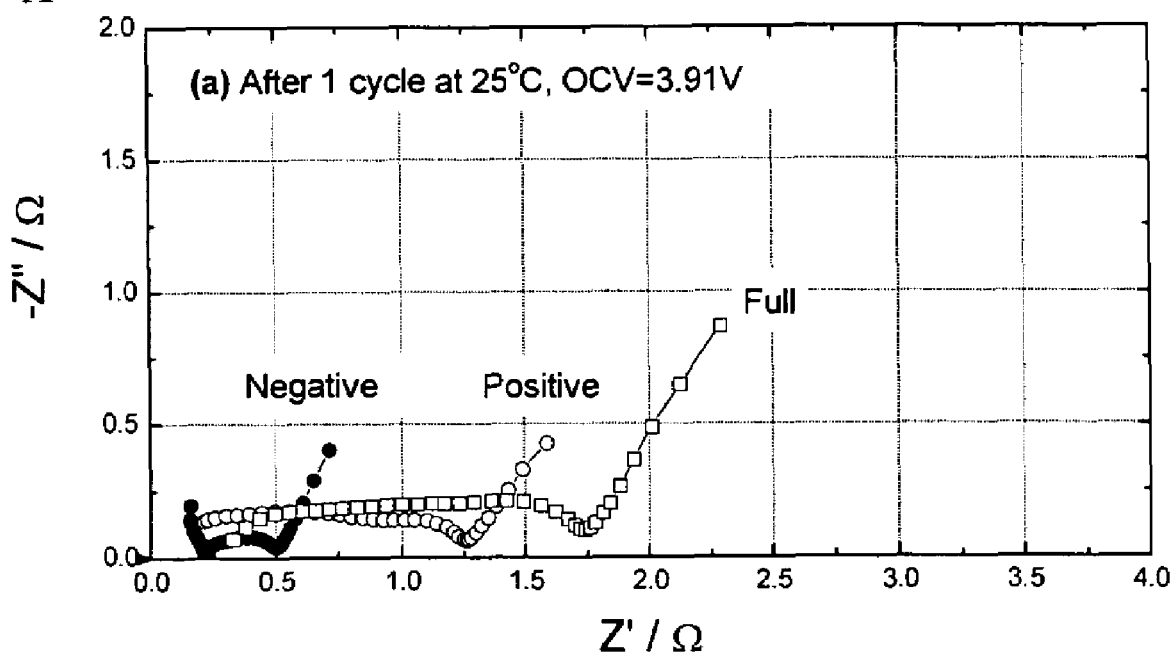
FIGS. 5A and 5B show impedance data for the anode and cathode components of the graphite/$Li_{1.06}Mn_{1.94-x}Al_xO_4$ cell with Li—Sn alloy reference electrode (RE)
Figure 5:
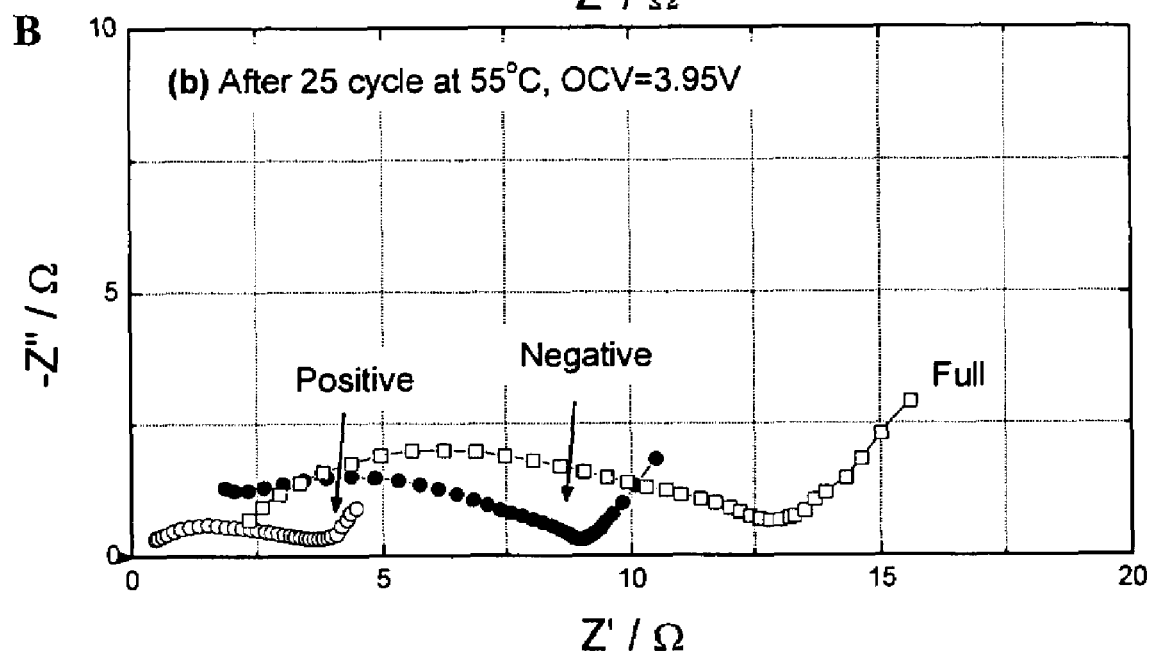

To investigate the origin of the significant degradation of the graphite/substituted spinel cells in spite of the suppressed $Mn^{2+}$ ion dissolution, the AC impedance of the cell was measured during cycling at 55° C. using a specially designed Li—Sn reference electrode. The results are shown in FIG. 5. The AC impedance was measured after one formation cycle at room temperature [FIG. 5A] and after 25 cycles at 55° C. [FIG. 5B]. At the initial stages of cycling, the impedance of the negative electrode was much smaller than that of the positive electrode; however, after 25 cycles at 55° C., the impedance of negative electrode increased significantly and overwhelmed that of the positive electrode.

The graphite anode cycled in the Li-ion cell based on manganese spinel at 55° C. was examined by energy dispersive spectroscopy (EDS). The EDS spectrum clearly showed the presence of Mn metal on the graphite surface. It is thought that the dissolved $Mn^{2+}$ was reduced at the graphite surface, whose potential is about 0.08V vs. $Li^0$, and played a catalytic role in forming a film at the graphite surface leading to the huge rise of interfacial impedance at the negative electrode.

Figure 6:
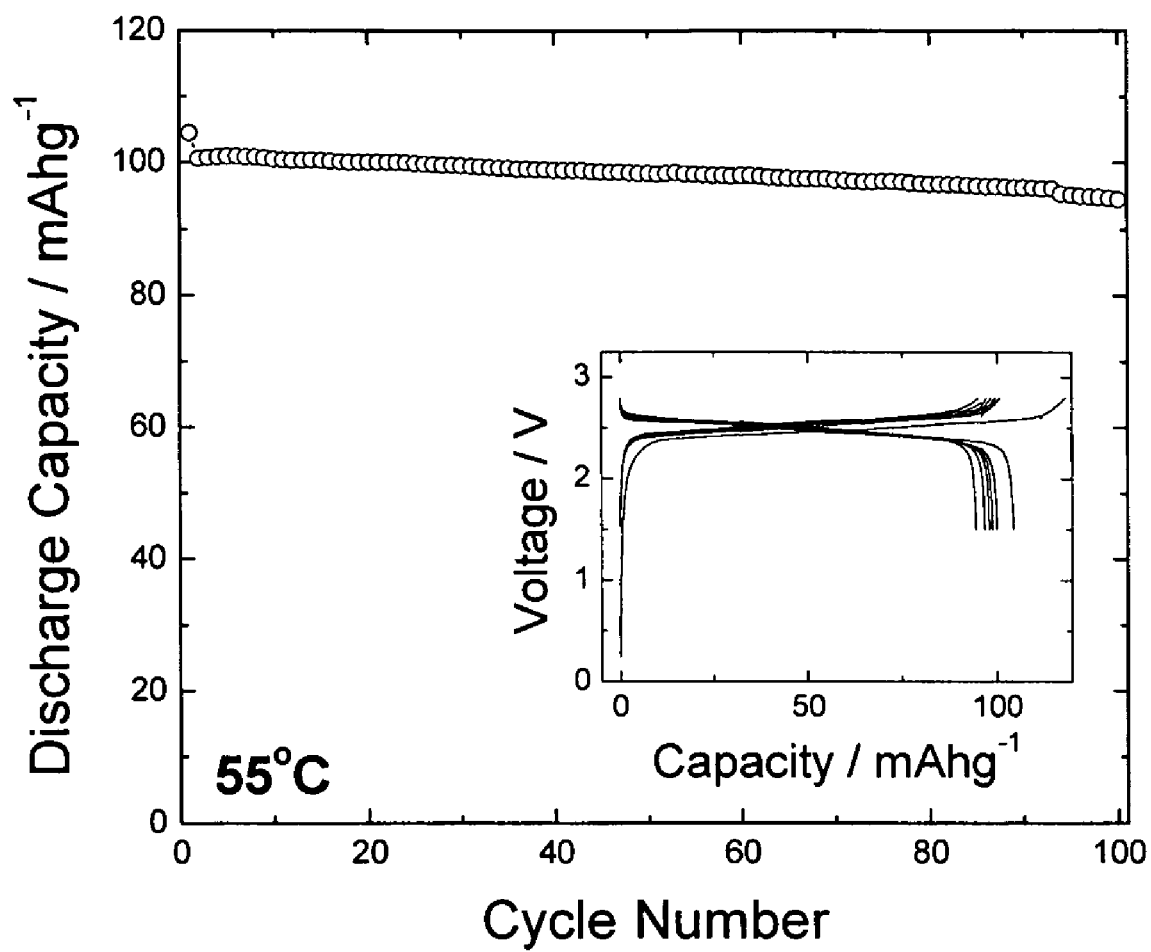
FIG. 6 is a schematic illustration of the specific capacity retention of a $Li_4Ti_5O_{12}$/substituted spinel cell cycled in the voltage range of 2.8-1.5V. The charge/discharge curves are shown in the inset. The electrolyte used is 1.2 M $LiPF_6$ EC:PC:DMC (1:1:3).

To prove this hypothesis, a cycling experiment was performed, using a $Li_4Ti_5O_{12}$ spinel anode, whose nominal voltage is about 1.5V vs. $Li^0$. FIG. 6 shows the cycling performance of the $Li_4Ti_5O_{12}/Li_{1.06}Mn_{1.94-x}Al_xO_4$ cell at 55° C. The result is that the $Li_4Ti_5O_{12}/Li_{1.06}Mn_{1.94-x}Al_xO_4$ cell exhibited excellent capacity retention (95% after 100 cycles) compared with the graphite/$Li_{1.06}Mn_{1.94-x}Al_xO_4$ cell, which we attribute to the fact that the $Mn^{2+}$ remains in the electrolyte solution and is not reduced on the $Li_4Ti_5O_{12}$ surface, due to its high reduction potential, wherein $0.01 \leq x \leq 0.05$.

Example 4

Figure 7:
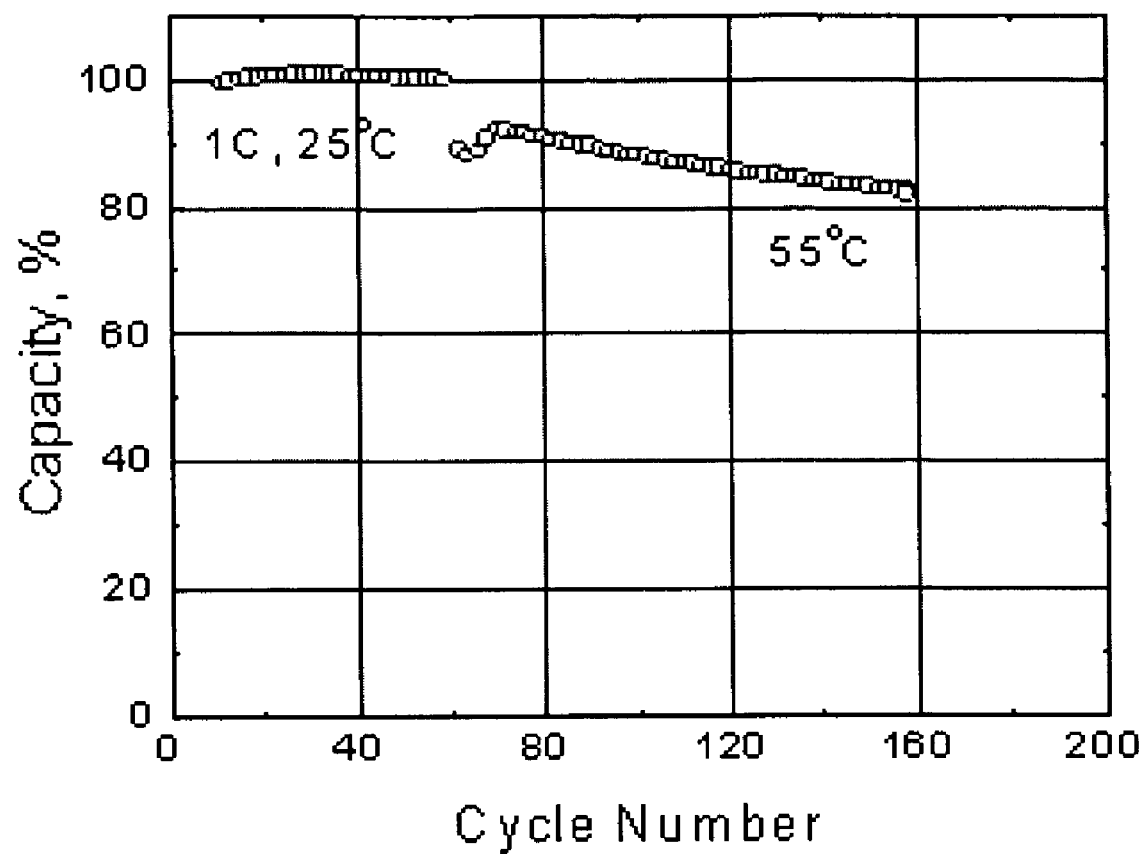
FIG. 7 is a schematic illustration of the specific capacity retention of $LiMn_2O_4$ cathode versus carbon anode in 1M $Li(C_2O_4)BF_2$ in EC/propylene carbonate (PC)/dimethyl carbonate (DMC) (1:1:3) electrolyte at 55° C.

1.0 M $Li(C_2O_4)BF_2$ in EC/PC/DMC (1/1/3) electrolyte was used in spinel/carbon cell system (carbon anode is GDR) instead of 1.2 M $LiPF_6$ in EC/EMC (3/7). The results of cycling the cell between 3.0 and 4.1 V are shown in FIG. 7. This cell system demonstrated an improved capacity retention over the electrochemical cell of Example 1. The improved performance of $Li(C_2O_4)BF_2$ is attributed to its greater stability compared to $LiPF_6$, i.e., $Li(C_2O_4)BF_2$ does not generate a strong acid that leaches the $Mn^{2+}$ ion from the spinel.

Example 5

Figure 8:
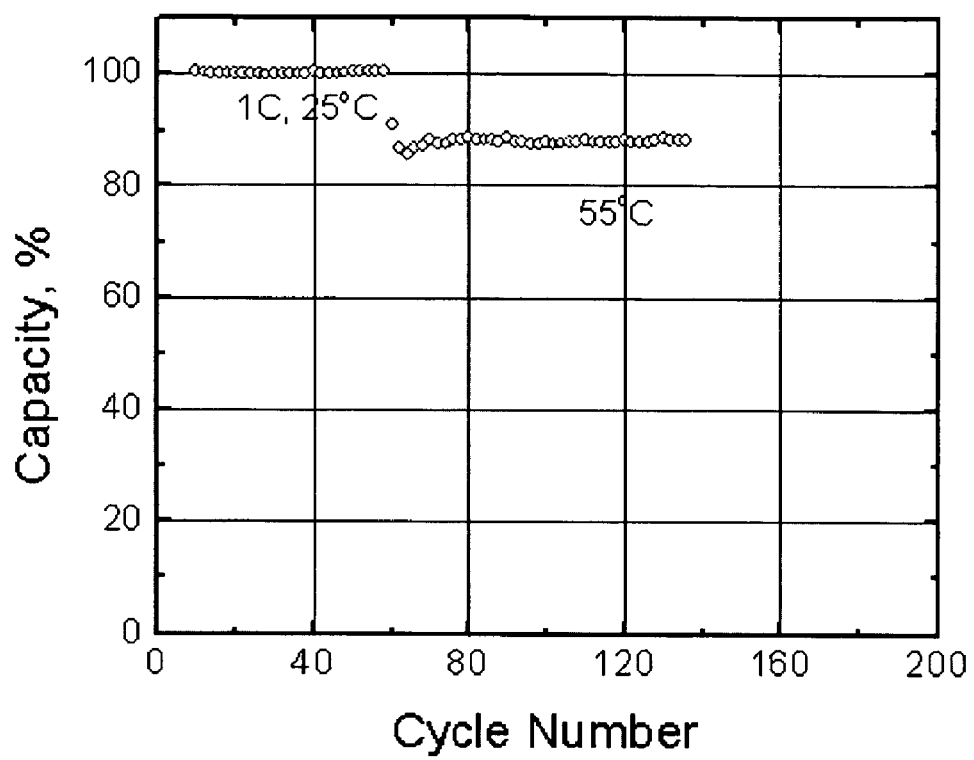
FIG. 8 is a schematic illustration of the specific capacity retention of $LiMn_2O_4$ cathode versus GDR carbon anode in 1M $Li(C_2O_4)BF_2$ in EC/PC/DMC (1:1:3) electrolyte with 1 wt % 3,9-divinyl-2,4,8,10-tetraoxaspiro[5.5]undecane as additives, at 55° C. The cell shows no capacity fade at 55° C. and 100% depth of discharge (DOD).

One wt % of TOS-1 was added to 1.0 M $Li(C_2O_4)BF_2$ in EC/PC/DMC electrolyte (1/1/3). The cell was cycled at 100% DOD at 25° C. and 55° C. between 3.0 and 4.1 V. As shown in FIG. 8, this cell system demonstrated stable capacity retention over the electrochemical cells of Examples 1, 2, and 4 (compare to FIGS. 2, 3, and 7). It is believed that the improvement results from the stabilizing effect of $Li(C_2O_4)BF_2$ on the electrolyte and the formation of a protective film on the surface of the electrodes by the TOS-1 additive that blocks the leaching of $Mn^{2+}$ ion from the spinel. This result fulfills a long-felt need which has been an issue among the world scientific community for the past 20 years. The combination of spirocyclic additive and lithiated borate salt in the cell has resulted in a complete stabilization of the spinel system.

Example 6

$LiFePO_4$ was prepared by a solid-state reaction of a 1:1:1 (molar ratio) mixture of iron(II) oxalate, ammonium dihydrogen phosphate and lithium carbonate. The precursors were mixed by ball milling in acetone overnight. The resulting gel was dried at 60° C. under vacuum, thoroughly reground, and finally heated under purified $N_2$ gas for 24 h at 700° C. The resulting gray powder was coated with carbon layers using a preheated flow of $N_2/C_3H_6$ in a gas phase process. The technique, called Carbon Coating Technology (CCT), consists of feeding a pre-heated reactor furnace containing olivine material with a mixture of $N_2$ an inert gas and propylene $C_3H_6$ as the carbon source gas. [See published U.S. patent application Ser. No. US2004/0157126.] The temperature at which the cracking of $C_3H_6$ was achieved was fixed at 700° C. The electrochemical study was carried out on both the $LiFePO_4$ and the carbon coated $LiFePO_4$. The electrode was 1.2M $LiPF_6$ in EC:PC:DMC (1:1:3).

Figure 9:
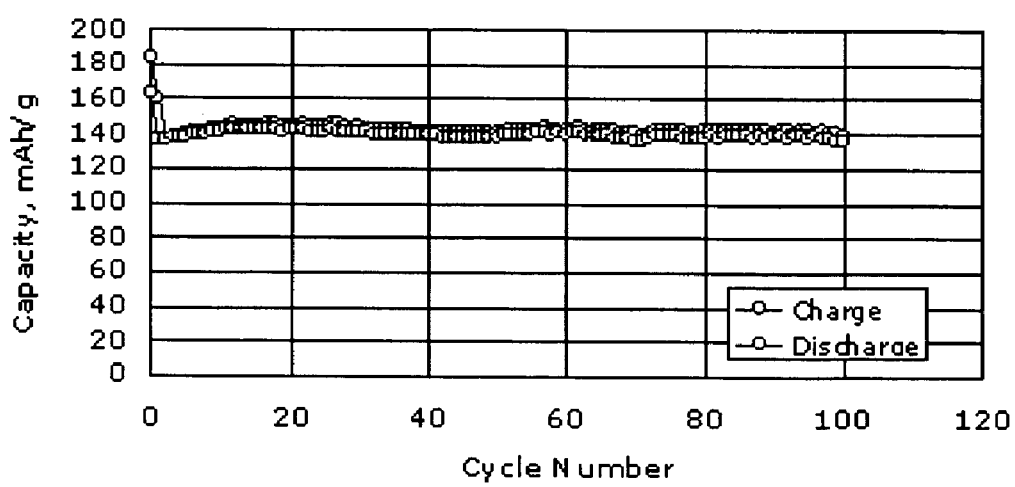
FIG. 9 is a graph of charge and discharge capacity vs. cycle number of carbon coated olivine (C—$LiFePO_4$)/lithium cell at C/3 and 25° C. The electrolyte used is 1.2 M $LiPF_6$ in EC:PC:DMC (1:1:3).
Figure 10:
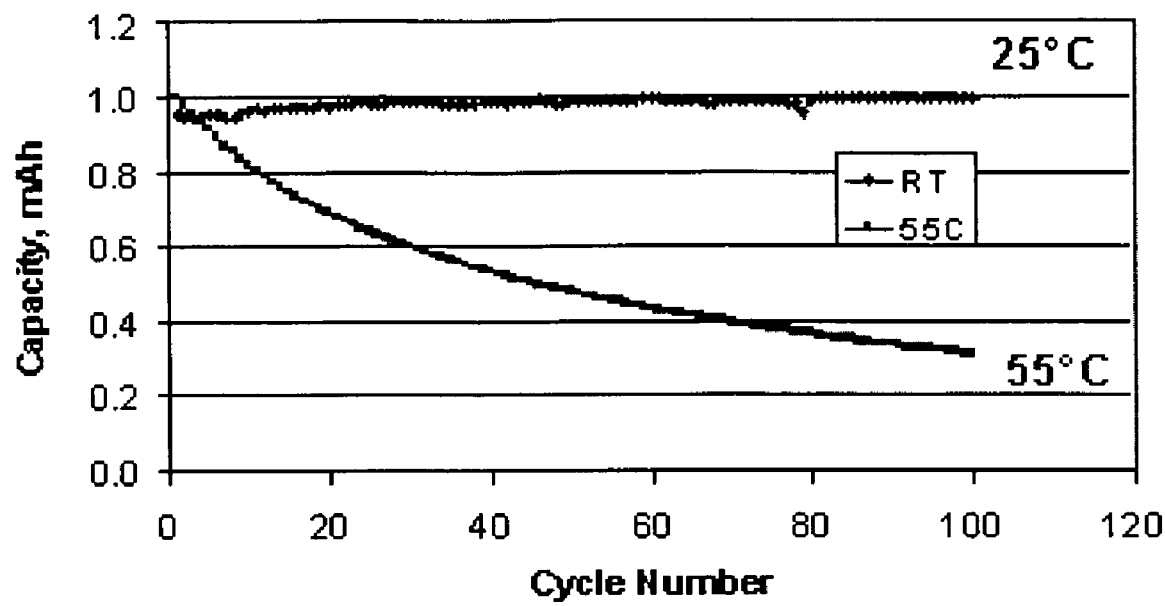
FIG. 10 is a graph of the discharge capacity vs. cycle number of C—$LiFePO_4$/Graphite at 25° C. and 55° C. with 1.2 M $LiPF_6$ in EC:PC:DMC (1:1:3) electrolyte. At 25° C., the cell cycled well with limited capacity loss. However, the cell cycled at 55° C. exhibits significant capacity loss: over 85% capacity fade after only 100 cycles.
Figure 11:
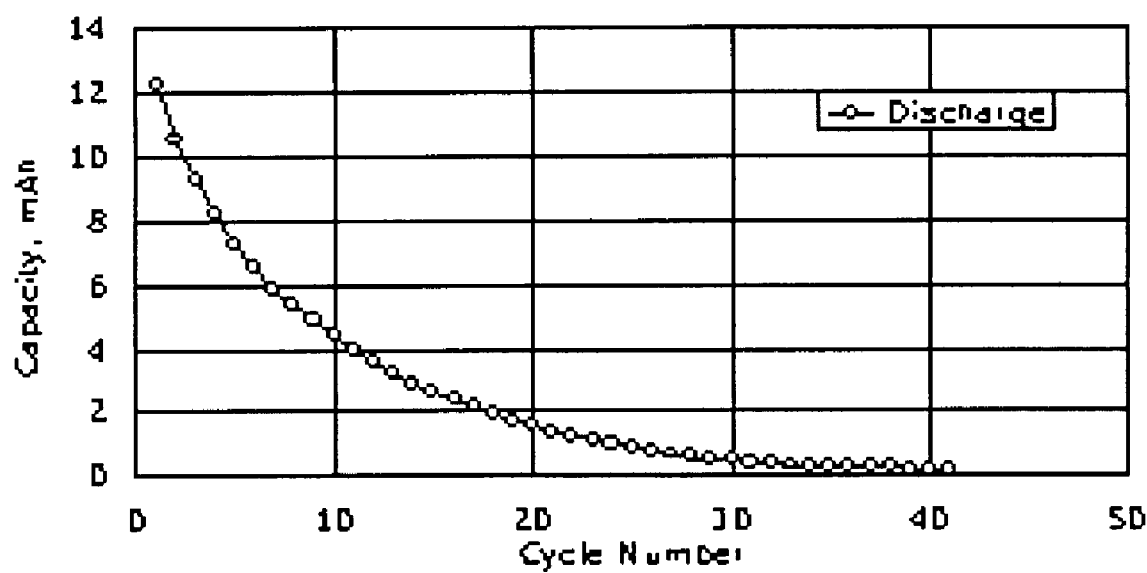
FIG. 11 is a graph of the capacity vs. cycle number of $LiFePO_4$/graphite cell at C/3 and 55° C. where it lost almost all its capacity after less than 50 cycles. The electrolyte used is 1.2 M $LiPF_6$ EC:PC:DMC (1:1:3).

FIG. 9 shows a typical charge-discharge voltage profile of carbon coated on $LiFePO_4$ (C-$LiFePO_4$) vs. a lithium metal counter at room temperature. The material cycles extremely well at C/3 rate with no capacity fade after 100 cycles. FIG. 10 shows the cycling characteristics of C-$LiFePO_4$ vs. MCMB graphite anode at both 25° C. and 55° C. At room temperature, the cell cycled very well with no capacity fade after 100 cycles. However, a significant capacity fade was observed when cycling the cell at 55° C. Similar results were also obtained when cycling a cell that comprised LiFePO$_4$ (without carbon coating) and graphite anode at 55° C. (FIG. 11).

Example 7

To understand the reason behind the significant capacity fade at 55° C., the stability of C-LiFePO$_4$ in the presence of electrolyte was investigated first. An appropriate amount of C-LiFePO$_4$ powder was immersed in LiPF$_6$ in EC:PC:DMC (1:1:3) and was heated at 55° C. for 2 weeks. The solution was then filtered and was subjected to inductively coupled plasma mass spectroscopy (ICP) analysis to look for traces of iron ions. After 2 weeks of aging the olivine C-LiFePO$_4$ powder in the LiPF$_6$ based electrolyte, over 535 ppm of Fe$^{2+}$ ions were detected in the electrolyte. The amount of iron dissolved increased with increasing temperature and time of aging. This result clearly confirms that Fe ions are dissolved in the electrolyte during cycling. However, the amount of active LiFePO$_4$ material associated with the small amount of Fe dissolution is insignificant and could not account for the major capacity loss observed during cycling the cell at 55° C.

Figure 12:
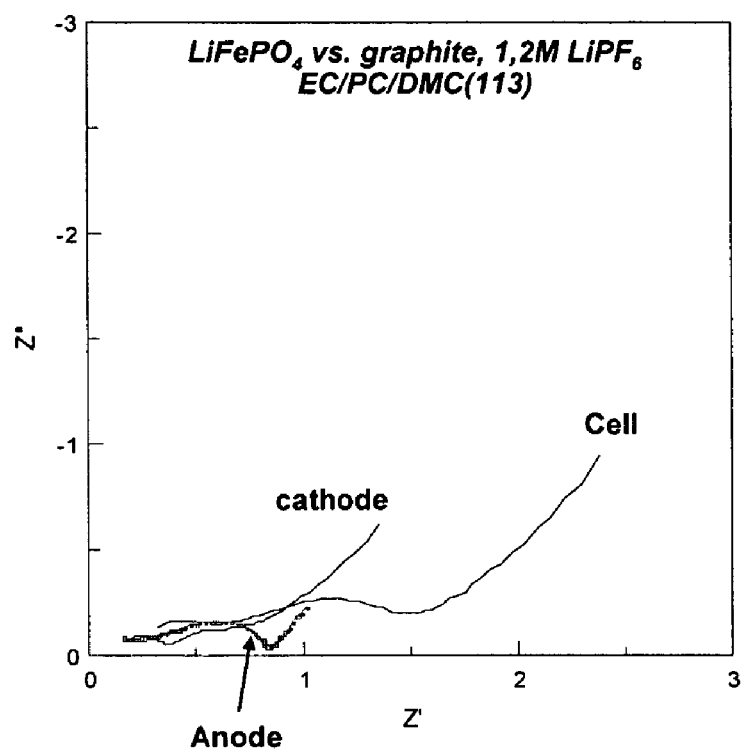
FIG. 12 shows the AC impedance of C—$LiFePO_4$/Graphite cell after the first cycle at 25° C. using a LiSn reference electrode with 1.2M $LiPF_6$/EC:PC:DMC (1:1:3) electrolyte. At this point, the impedance of the cathode is slightly larger than that of the anode.
Figure 13:
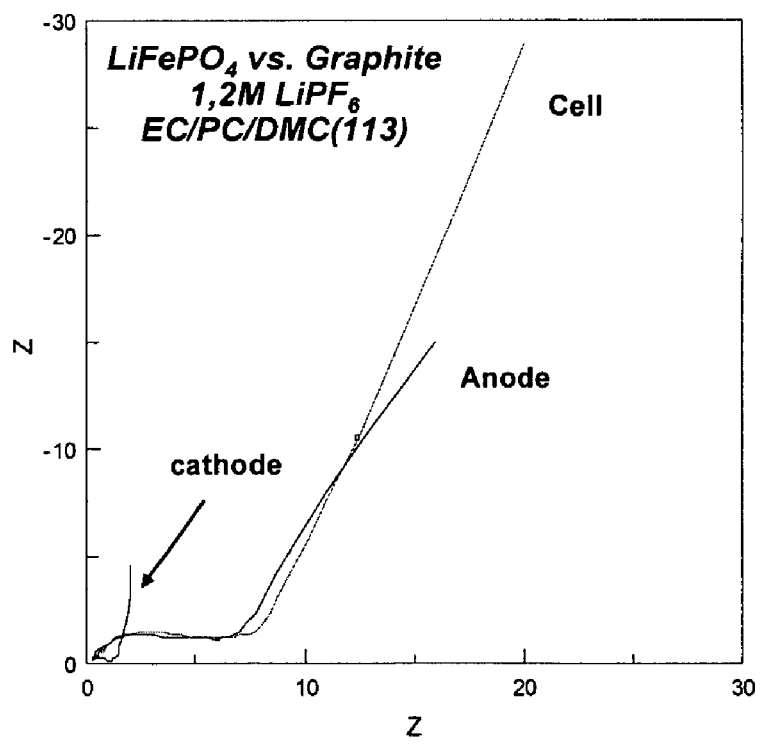
FIG. 13 shows that after cycling the C—$LiFePO_4$/Graphite cell with 1.2M $LiPF_6$/EC:PC:DMC (1:1:3) electrolyte at 55° C. for 50 cycles, the AC impedance analysis indicates the graphite negative electrode impedance has increased significantly.

To investigate the origin of the significant degradation of the graphite/LiFePO$_4$ cells during cycling at 55° C., the AC impedance of the cell during cycling at 55° C. was measured using a specially designed Li—Sn reference electrode. The results are shown in FIGS. 12 and 13. The AC impedance was measured after one formation cycle at room temperature (FIG. 12) and after 50 cycles at 55° C. (FIG. 13). At the initial stages of cycling, the impedance of the negative electrode and positive electrode are very similar; however, after 50 cycles at 55° C., the impedance of the negative electrode increased significantly and is almost 90% of the total cell impedance.

The graphite anode cycled in the Li-ion cell based on an olivine cathode at 55° C. was examined using EDS. The EDS spectrum (not shown) clearly showed the presence of Fe metal on the graphite surface. It is thought that the dissolved Fe$^{2+}$ was reduced at the graphite surface, whose potential is about 0.06V to about 0.1V vs. Li$^0$, and played a catalytic role in forming a film at the graphite surface, leading to the huge rise of interfacial impedance at the negative electrode.

Figure 14:
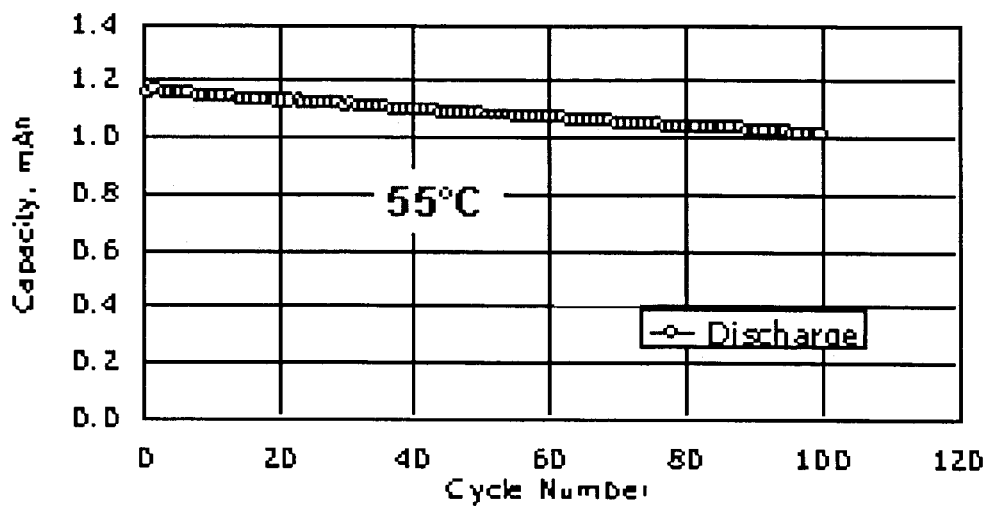
FIG. 14 is a graph of the discharge capacity vs. cycle number of C—$LiFePO_4$/$Li_4Ti_5O_{12}$ cell with 1.2M $LiPF_6$/EC:PC:DMC (1:1:3) electrolyte at C/3 and 55° C. indicates that the capacity fade is very limited because Fe ions are not reduced to Fe metal on the surface of the $Li_4Ti_5O_{12}$ anode that is at a voltage 1.5V which is its nominal voltage.

To prove this hypothesis, a cycling experiment was performed using a Li$_4$Ti$_5$O$_{12}$ spinel anode, whose nominal voltage is about 1.5V vs. Li$^0$. FIG. 14 shows the cycling performance of the Li$_4$Ti$_5$O$_{12}$/LiFePO$_4$ cell at 55° C. The result is that the Li$_4$Ti$_5$O$_{12}$/LiFePO$_4$ cell exhibited excellent capacity retention (80% after 100 cycles) compared with the graphite/LiFePO$_4$ cell. This can be attributed to the fact that the Fe$^{2+}$ remains in the electrolyte solution and is not reduced on the Li$_4$Ti$_5$O$_{12}$ surface, due to its high reduction potential.

Example 8

The present example shows that the performance of the olivine LiFePO$_4$ cell system can be improved by use of less acidic electrolyte salts. Of particular interest are LiBoB, Li(C$_2$O$_4$)BF$_2$, and LiPF$_2$C$_4$O$_8$. Since that these salts do not produce a strong acidic environment, Fe$^{2+}$ dissolution should be significantly reduced or suppressed with such electrolytes. LiFePO$_4$ powders were stored at 55° C. for two weeks in both 0.7M LiBoB in EC:PC:DMC (1:1:3) and in the 1.2M LiPF$_6$ in EC:PC:DMC (1:1:3). ICP was used to detect the amount of Fe$^{2+}$ in solution. As expected, only a negligible amount of Fe$^{+2}$ ions were detected from the solution taken from the powder that was aged in the LiBoB based electrolyte (less than 3.7 ppm). By contrast, the LiPF$_6$ based electrolyte displayed a significant amount of Fe$^{+2}$ ions (535 ppm).

Figure 15:
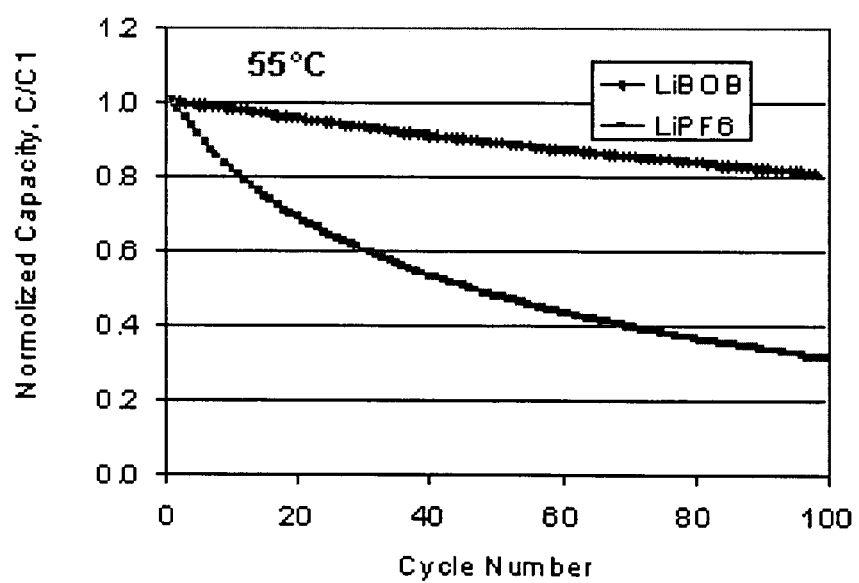
FIG. 15, The C—$LiFePO_4$/graphite cell capacity vs. cycle number at C/3 and 55° C. using 0.7M LiBoB in EC:PC:DMC (1:1:3) and 1.2M $LiPF_6$ in EC:PC:DMC (1:1:3) electrolytes.

FIG. 15 is a comparison of the capacity fade of the C—LiFePO$_4$ versus graphite at 55° C. in 9.7M LiBoB in EC:PC:DMC (1:1:3) and 1.2M LiFP$_6$ in EC:PC:DMC (1:1:3) electrolytes. The cycling performance of the graphite/C—LiFePO$_4$ cell with LiBoB-based electrolyte was remarkably improved at 55° C., which is consistent with the limited amount of iron leaching observed when using LiBoB electrolyte. These results indicate that the olivine appears to be much more stable in the LiBoB-based electrolyte than it is in the LiPF$_6$-based electrolyte.

Example 9

Figure 16:
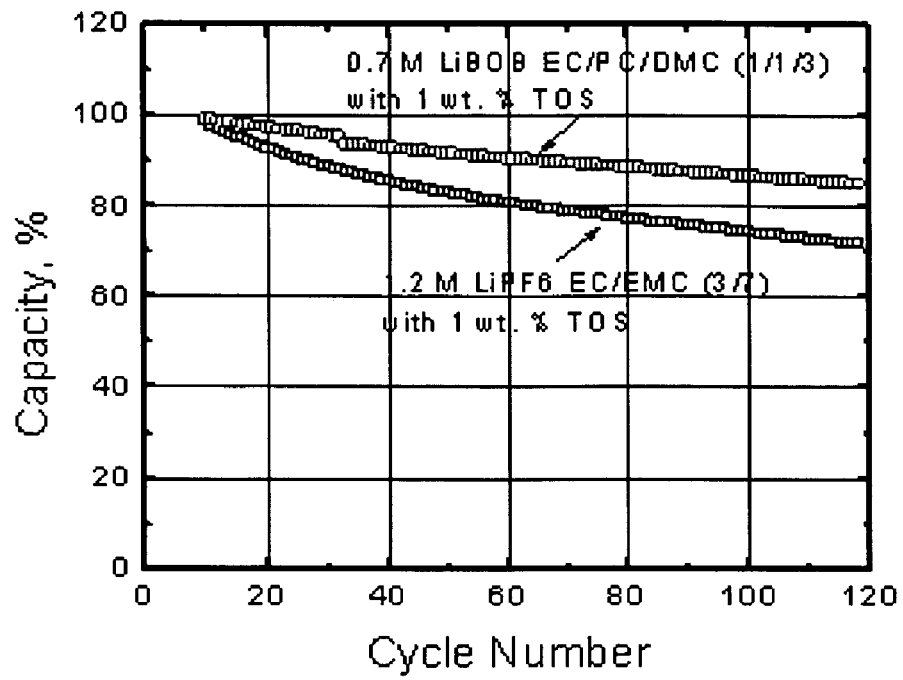
FIG. 16 is a schematic illustration of the specific capacity retention at 55° C. of C—$LiFePO_4$ olivine cathode versus a GDR carbon anode in 1.2M $LiPF_6$ in EC:PC:DMC (1:1:3) and in 0.7M LiBoB in EC:PC:DMC (1:1:3). In both electrolytes, 1 wt % 3,9-divinyl-2,4,8,10-tetraoxaspiro[5.5]undecane additives was added.

The present example compares the capacity fade of a C—LiFePO$_4$/Graphite cell using either 1.2M LiPF$_6$ in EC:PC:DMC (1:1:3) electrolyte having 1 wt % TOS-1 additive, and 0.7M LiBoB in EC:PC:DMC (1:1:3) having 1 wt % TOS-1. The cell was then cycled between 3.0 and 4.1 V at 100% DOD at 55° C. for many cycles. As shown in FIG. 16, each cell demonstrated improved capacity retention over similar electrochemical cells without an additive (compare to FIG. 15).

Example 10

Figure 17:
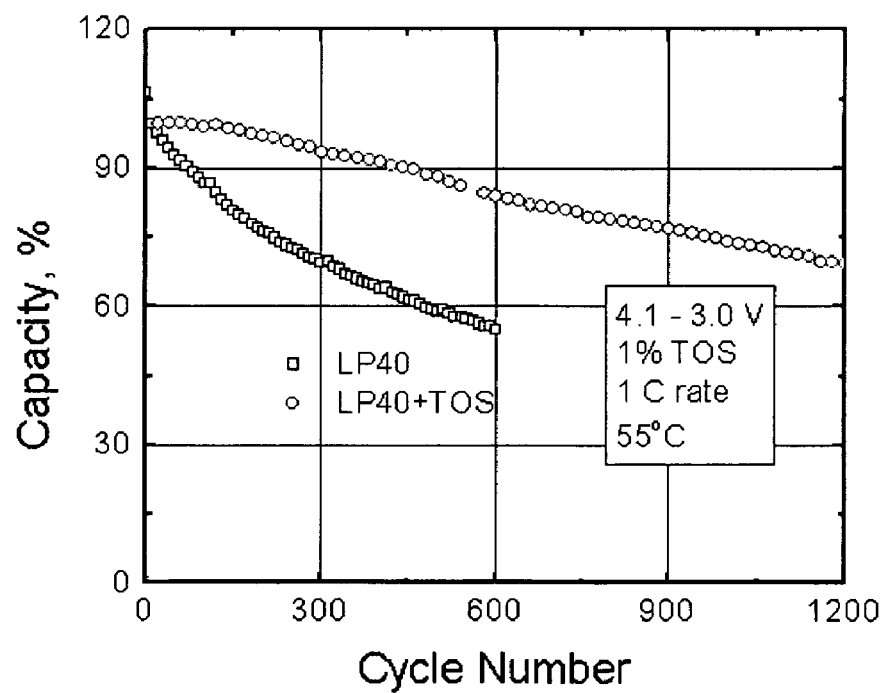
FIG. 17 is a graph of discharge capacity vs. cycle number of in $LiNi_{1/3}Co_{1/3}Mn_{1/3}O_2$ (10% excess Li)/MCMB10-28 cell systems in 1.0 M $LiPF_6$/EC/DEC (1/1) electrolyte (LP-40) with and without 1 wt % TOS-1 additive at 1 C rate and 55° C.

In the present example, to 1.0 M LiPF$_6$/EC/DEC (1/1) electrolyte, denoted as LP-40 in FIG. 17, was added 1 wt % of TOS-1. LiNi$_{1/3}$Co$_{1/3}$Mn$_{1/3}$O$_2$ (10% excess Li)/MCMB10-28 cell systems in 1.0 M LiPF$_6$/EC/DEC (1/1) electrolyte with and without TOS-1 additive then were cycled at 1 C rate and 55° C. between 3.0V and 4.1V. A marked improvement was observed in capacity retention for the cell with the TOS additive in the electrolyte, with 70% capacity remaining after 1200 cycles at 55° C. (See FIG. 17). However, only 55% capacity remained after just 600 cycles at 55° C. in cell systems without a TOS-1 additive. It is believed that the improvement is due to the film formation of a passivating film from the TOS-1 additive on the surface of electrode.

Example 11

Figure 18:
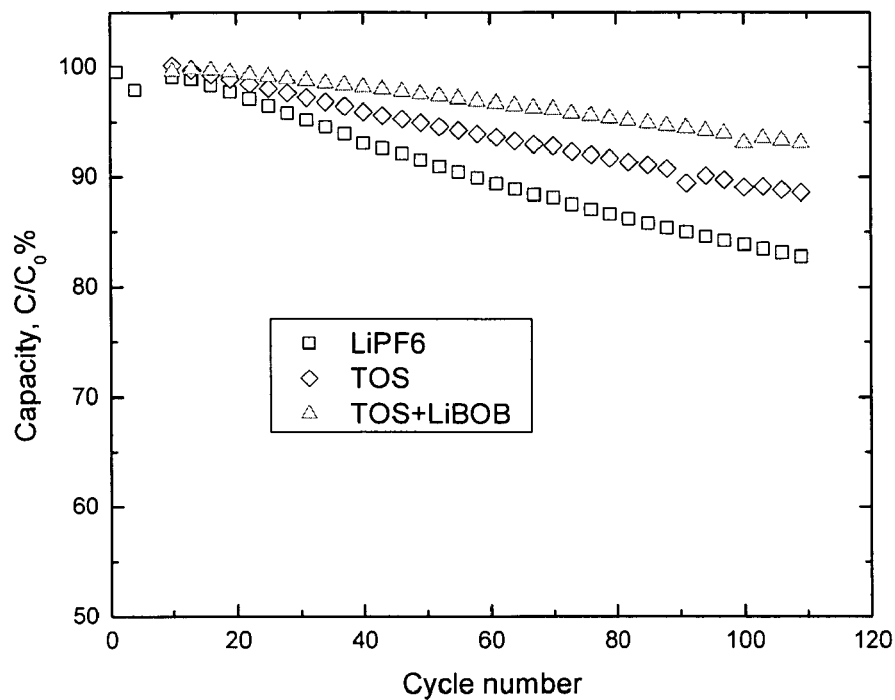
FIG. 18 is a graph of capacity vs. cycle number of $LiNi_{1/3}Co_{1/3}Mn_{1/3}O_2$ (10% excess Li)/MCMB10-28 cell at 1 C rate and 55° C. using 1.2 M $LiPF_6$/EC/PC/DMC (1/1/3) electrolyte without additive, with 1% TOS-1, with 1% TOS-1 plus 1% lithium bis-oxalatoborate (LiBoB).

In this example 1 wt % TOS-1, and a combination of 1 wt % TOS-1 plus 1 wt % LiBoB were separately added to a 1.2 M LiPF$_6$/EC/PC/DMC (1/1/3) electrolyte. The two electrolytes with TOS-1 and TOS-1+LiBoB additives, along with 1.2 M LiPF$_6$/EC/PC/DMC (1/1/3) electrolyte as reference, were used in LiNi$_{1/3}$Co$_{1/3}$Mn$_{1/3}$O$_2$ (10% excess Li)/MCMB10-28 cell systems. The cells were cycled at 100% DOD, 1 C rate, and 55° C. between 3.0V and 4.0 V. This cell system demonstrated that while the TOS additive improves the cell capacity retention at elevated temperature to 88%, the combination of TOS-1 and LiBoB additive improves the capacity retention further to 93%, as compared to cells without additives that show capacity of only 83% (See FIG. 18). The better cell performance for the combination of 1 wt % TOS-1 and 1 wt % LiBoB may be attributed to surface protection of both the anode and cathode electrodes. Therefore, the combination of additives may include spirocyclic additives and any other additive capable of film formation on the surface of an anode. These other additives may include, but are not limited to LiBoB, Li(C$_2$O$_4$)BF$_2$, LiPF$_2$C$_4$O$_8$, vinyl carbonate, vinyl ethylene carbonate, and others.

Example 12

Figure 19:
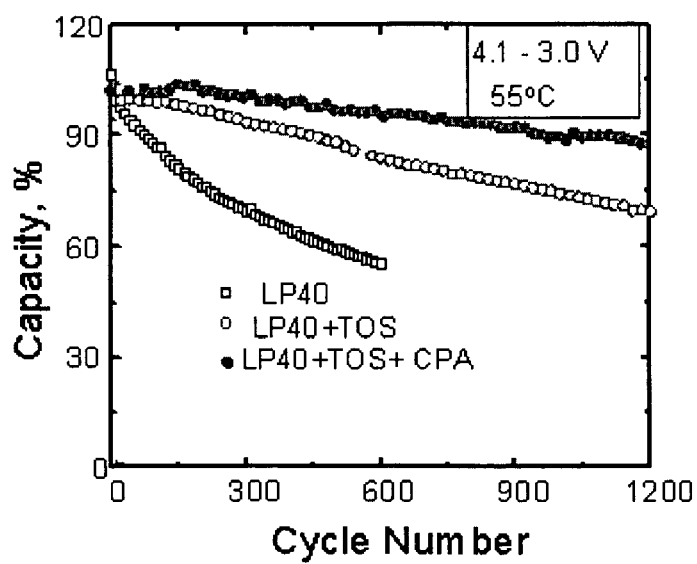
FIG. 19 is a graph of capacity vs. cycle number of $LiNi_{1/3}Co_{1/3}Mn_{1/3}O_2$ (10% excess Li)/MCMB10-28 cell at 1 C rate and 55° C. using 1.2 M $LiPF_6$/EC/PC/DMC (1/1/3) electrolyte without additive, with 1% TOS-1, with 0.1% TOS-1 plus 10% P-ethoxy-P,P',P"-pentafluorocyclotriphosphazene (Formula III, as describe below).

In this example, 1 wt % TOS-1, and a combination of 0.1% TOS-1+10% of P-ethoxy-P,P',P'''-pentafluorocyclotriphosphazene (CPA in FIG. 19) were added to 1.2 M LiPF$_6$/EC/PC/DMC (1/1/3) electrolyte, separately. The two electrolytes with TOS-1 and TOS-1+P-ethoxy-P,P',P"-pentafluorocyclotriphosphazene, along with 1.2 M LiPF$_6$/EC/PC/DMC (1/1/3) electrolyte as reference, were used in LiNi$_{1/3}$Co$_{1/3}$Mn$_{1/3}$O$_2$ (10% excess Li)/MCMB10-28 cell systems. The cells were cycled at 100% DOD, 1 C rate, and 55° C. between 3.0V and 4.0 V. This cell system demonstrated that the TOS-1+P-ethoxy-P,P',P"-pentafluorocyclotriphosphazene further improves the cell capacity retention at elevated temperature (see FIG. 19). Other cyclotriphosphazenes that may be used include, but are not limited to: P,P'-diethoxy-P,P',P"-tetrafluorocyclotriphosphazene (IV), P-phenoxy-P,P',P"-pentafluorocyclotriphosphazene (V), P,P',P"-hexamethoxycyclotriphosphazene (VI), and P-phenoxy-P'-(prop-2-eneoxy)-P,P',P"-pentafluorocyclotriphosphazene (VII).

While certain embodiments have been illustrated and described, it should be understood that changes and modifications can be made therein in accordance with one of ordinary skill in the art without departing from the invention in its broader aspects. Various features of the invention are defined in the following claims.

What is claimed is:

1. An electrolyte comprising:
   an alkali metal salt;
   a polar aprotic solvent; and
   an electrode stabilizing additive that is a substituted or unsubstituted spirocyclic hydrocarbon containing at least one oxygen atom and at least one alkenyl or alkynyl group;
   wherein the electrolyte is substantially non-aqueous.

2. The electrolyte of claim 1, wherein the electrode stabilizing additive contains 1, 2, 3, 4, 5, or 6 oxygen atoms.

3. The electrolyte of claim 1, wherein the electrode stabilizing additive has 1 or 2 alkenyl groups.

4. The electrolyte of claim 1, wherein the electrode stabilizing additive has the Formula I:

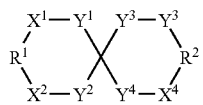

I wherein
   $X^1$, $X^2$, $X^3$, and $X^4$ are independently O or CR$^3$R$^4$; provided that $X^1$ is not O when $Y^1$ is O, $X^2$ is not O when $Y^2$ is O, $X^3$ is not O when $Y^3$ is O, and $X^4$ is not O when $Y^4$ is O;
   $Y^1$, $Y^2$, $Y^3$, and $Y^4$ are independently O or CR$^3$R$^4$; provided that $Y^1$ is not O when $X^1$ is O, $Y^2$ is not O when $X^2$ is O, $Y^3$ is not O when $X^3$ is O, and $Y^4$ is not O when $X^4$ is O;
   $R^1$ and $R^2$ are independently a substituted or unsubstituted divalent alkenyl or alkynyl group; and
   $R^3$ and $R^4$ at each occurrence are independently H, F, Cl, a substituted or an unsubstituted alkyl, alkenyl, or alkynyl group.

5. The electrolyte of claim 4, wherein at least one of $X^1$, $X^2$, $X^3$, and $X^4$ is O.

6. The electrolyte of claim 4, wherein $X^1$ is O.

7. The electrolyte of claim 4, wherein each of $X^1$, $X^2$, $X^3$, and $X^4$ is O.

8. The electrolyte of claim 4, wherein $R^1$ and $R^2$ are the same.

9. The electrolyte of claim 8, wherein $R^1$ and $R^2$ are each CH—CH=CH$_2$, C=CH$_2$, or C=CHCH$_3$.

10. The electrolyte of claim 4, wherein at each occurrence $R^3$ and $R^4$ are each H.

11. The electrolyte of claim 4, wherein the stabilizing additive is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof.

12. The electrolyte of claim 1, wherein the stabilizing additive is present in an amount of about 0.0005 to about 15 wt %.

13. The electrolyte of claim 1, wherein the stabilizing additive is present in an amount of about 0.0005 to about 2 wt %.

14. The electrolyte of claim 1, wherein the alkali metal salt is a lithium salt.

15. The electrolyte of claim 1, wherein the alkali metal salt is Li[(C$_2$O$_4$)$_2$B], Li(C$_2$O$_4$)BF$_2$, LiPF$_2$C$_4$O$_8$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, lithium alkyl fluorophosphates, or a mixture of any two or more thereof.

16. The electrolyte of claim 1, wherein the alkali metal salt is lithium (chelato)borate.

17. The electrolyte of claim 1, wherein the alkali metal salt is Li(C$_2$O$_4$)BF$_2$, Li[(C$_2$O$_4$)$_2$B], or a mixture of any two or more thereof.

18. The electrolyte of claim 1, wherein the polar aprotic solvent is ethyl acetate, propyl acetate, ethylene carbonate, propylene carbonate, dimethyl carbonate, diethyl carbonate, ethyl methyl carbonate, dimethyl ether, diethyl ether, methylacetate, gamma-butyrolactone, or a mixture of any two or more thereof.

19. An electrolyte comprising:
   an alkali metal salt;
   a polar aprotic solvent; and
   an electrode stabilizing additive having Formula II:

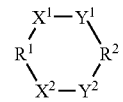

II wherein,
   $X^1$ and $X^2$ are independently O, CHR$^3$, CHR$^4$, or CR$^3$R$^4$; provided that $X^1$ is not O when $Y^1$ is O, and $X^2$ is not O when $Y^2$ is O;
   $Y^1$ and $Y^2$ are independently O, CHR$^3$, CHR$^4$, or CR$^3$R$^4$; provided that $Y^1$ is not O when $X^1$ is O and $Y^2$ is not O when $X^2$ is O;
   $R^1$ and $R^2$ are independently a substituted or unsubstituted divalent alkenyl or alkynyl group;
   $R^3$ and $R^4$ at each occurrence are independently H, F, Cl, a substituted or an unsubstituted alkyl, alkenyl, or alkynyl group; and
   wherein the electrolyte is substantially non-aqueous; and
   the electrode stabilizing additive is 2,4-diviynl-tetrahydropyran, 2,5-divinyl-tetrahydropyran, 2,6-divinyl-tetrahydropyran, 2,5-divinyl-[1,4]dioxane, 2,5-divinyl-[1,3]dioxane, 2-ethylidene-5-vinyl-[1,3]dioxane or a mixture of any two or more thereof.

20. A method of making the electrolyte of claim 1, the method comprising combining
an alkali metal salt;
a polar aprotic solvent; and
an electrode stabilizing additive that is a spirocyclic hydrocarbon containing at least one oxygen atom and at least one alkenyl or alkynyl group.

21. An electrolyte comprising:
an alkali metal salt;
a polar aprotic solvent;
a first electrode stabilizing additive that is a substituted or unsubstituted spirocyclic hydrocarbon containing at least one oxygen atom and at least one alkenyl or alkynyl group; and
a second electrode stabilizing additive that is capable of stabilizing an anode;
wherein the electrolyte is substantially non-aqueous.

22. The electrolyte of claim 21 wherein the second electrode stabilizing additive is selected from vinyl ethylene carbonate, vinyl carbonate, a lithium (chelato)borate, a lithium (chelato)phosphate, a cyclotriphosphazene, or a mixture of any two or more thereof.

23. The electrolyte of claim 22, wherein the lithium(chelato)borate is selected from $Li(C_2O_4)_2B$, $Li(C_2O_4)BF_2$, or a mixture thereof.

24. The electrolyte of claim 22, wherein the lithium(chelato)phosphate is $LiPF_2C_4O_8$.

25. The electrolyte of claim 22, wherein the cyclotriphosphazene is selected from P-ethoxy-P,P',P"-pentafluorocyclotriphosphazene, P,P'-diethoxy-P,P',P"-tetrafluorocyclotriphosphazene, P-phenoxy-P,P',P"-pentafluorocyclotriphosphazene, P,P',P"-hexamethoxycyclotriphosphazene, P-phenoxy-P'-(prop-2-ene-oxy)-P,P',P"-pentafluorocyclotriphosphazene, or mixtures of any two or more thereof.

26. The electrolyte of claim 21, wherein the second electrode stabilizing additive is present between about 0.01 wt % and about 15 wt %.

27. The electrolyte of claim 21, wherein the alkali metal salt is other than $Li(C_2O_4)_2B$, $Li(C_2O_4)BF_2$, or $LiPF_2C_4O_8$.

* * * * *

UNITED STATES PATENT AND TRADEMARK OFFICE
CERTIFICATE OF CORRECTION

PATENT NO.         : 7,507,503 B2                                         Page 1 of 1
APPLICATION NO. : 11/297120
DATED              : March 24, 2009
INVENTOR(S)        : Khalil Amine et al.

It is certified that error appears in the above-identified patent and that said Letters Patent is hereby corrected as shown below:

In Column 5, after line 2 - replace Formula I:

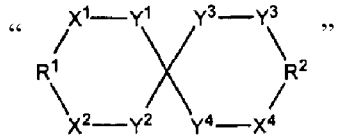

With the following formula:

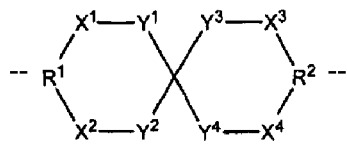

In Claim 4, Column 17 - replace Formula I:

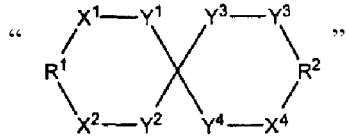

With the following formula:

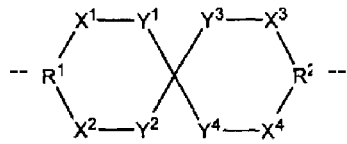

Signed and Sealed this

Fifth Day of May, 2009

*John Doll*

JOHN DOLL
*Acting Director of the United States Patent and Trademark Office*